United States Patent [19]

Manning et al.

[11] Patent Number: 5,285,561
[45] Date of Patent: Feb. 15, 1994

[54] HOSE COUPLING, FERRULE THEREFOR AND METHODS OF MAKING THE SAME

[75] Inventors: Timothy J. Manning, Eldora; Jerome P. Hoffman, New Providence, both of Iowa

[73] Assignee: Dayco Products, Inc., Dayton, Ohio

[21] Appl. No.: 934,048

[22] Filed: Aug. 21, 1992

[51] Int. Cl.$^5$ .............................................. B21H 8/00
[52] U.S. Cl. ........................................ 29/417; 72/70
[58] Field of Search ................ 72/70, 71, 72; 29/417; 285/256

[56] References Cited

U.S. PATENT DOCUMENTS

| | | | |
|---|---|---|---|
| 3,299,680 | 1/1967 | Thompson | 72/82 |
| 3,653,240 | 4/1972 | Huthsing, Jr. | 72/82 |
| 4,150,466 | 4/1979 | Horvath | 285/256 |
| 4,162,569 | 7/1979 | Damusis et al. | 29/417 |
| 4,305,608 | 12/1981 | Stuemky et al. | 285/256 |
| 4,653,779 | 3/1987 | Foster | 285/256 |

*Primary Examiner*—Lowell A. Larson
*Attorney, Agent, or Firm*—Joseph V. Tassone

[57] ABSTRACT

A hose coupling, ferrule therefor and methods of making the same are provided, the method of making the hose coupling comprising a ferrule having opposed ends and an insert interconnected to one of the ends of the ferrule so that an end of a hose can be inserted into the other end of the ferrule and over the insert to be subsequently clamped between the ferrule and the insert, the method comprising the steps of forming the ferrule from a length of tubular stock that has opposed ends by rotating the stock, inwardly swedging the stock at a predetermined location thereon to define the one end of the ferrule while the stock is rotating, and then cutting off a portion of the stock at a desired location thereon that is spaced inwardly from that one end of the stock to form the ferrule.

5 Claims, 5 Drawing Sheets

HOSE COUPLING, FERRULE THEREFOR AND METHODS OF MAKING THE SAME

BACKGROUND OF THE INVENTION

1. Field of the Invention

This invention relates to a new hose coupling and to a new ferrule therefor as well as to new methods of making such a hose coupling and such a ferrule.

2. Prior Art Statement

It is known to make a hose coupling that comprises a ferrule having opposed ends and an insert interconnected to one of the ends of the ferrule so that an end of a hose can be inserted into the other of the ends of the ferrule and over the insert to be subsequently clamped between the ferrule and the insert, the ferrule being formed by radially inwardly forcing a tubular member in a machined die.

SUMMARY OF THE INVENTION

It is one of the features of this invention to provide a new method of making a ferrule for a hose coupling wherein the ferrule can be made from tubular stock in a simple and effective manner.

In particular, the prior known method of making such a ferrule from tubular stock required the making of dies that radially inwardly compress a tubular member therebetween in order to form the ferrule from the tubular member whereby a different set of dies was required for each ferrule that had a different diameter.

However, it was found according to the teachings of this invention that by merely rotating a length of tubular stock and while the stock is rotating, radially inwardly swedging a part thereof in a desired location in a simple and effective manner, ferrules can be uniquely formed from such rotating stock.

For example, one embodiment of this invention comprises a method of making a hose coupling that comprises a ferrule having opposed ends and an insert interconnected to one of the ends of the ferrule so that an end of a hose can be inserted into the other of the ends of the ferrule and over the insert to be sequently clamped between the ferrule and the insert, the method comprising steps of forming the ferrule from a length of tubular stock that has opposed ends by rotating the stock, inwardly swedging the stock at a predetermined location thereon to define one end of the ferrule while the stock is rotating, and then cutting off a portion of the stock at a desired location thereon that is spaced inwardly from the one end of the stock to form the ferrule.

Accordingly, it is an object of this invention to provide a new method of making a hose coupling, the method of this invention having one or more of the novel features of this invention as set forth above or hereinafter shown or described.

Another object of this invention is to provide a new hose coupling made by such a method, the hose coupling of this invention having one or more of the novel features of this invention as set forth above or hereinafter shown or described.

Another object of this invention is to provide a new method of making a ferrule for a hose coupling, the method of this invention having one or more of the novel features of this invention as set forth above or hereinafter shown or described.

Another object of this invention is to provide a new ferrule made by such a method, the ferrule of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
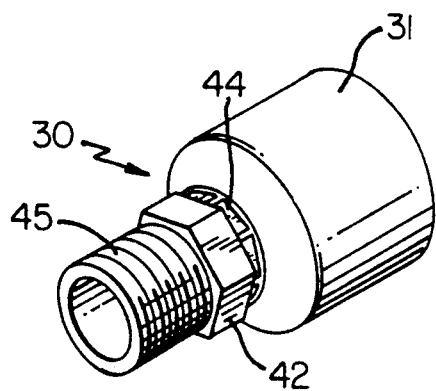
FIG. 1 is a perspective view of a new hose coupling of this invention.

While the various features of this invention are hereinafter illustrated and described as being particularly adapted to provide a hose coupling with a particular configuration of the ferrule and insert therefor it is to be understood that the various features of this invention can be utilized singly or in various combinations thereof to provide hose couplings with other configurations as desired.

Therefore, this invention is not to be limited to only the embodiments illustrated in the drawings, because the drawings are merely utilized to illustrate one of the wide variety of uses of this invention.

Figure 2:
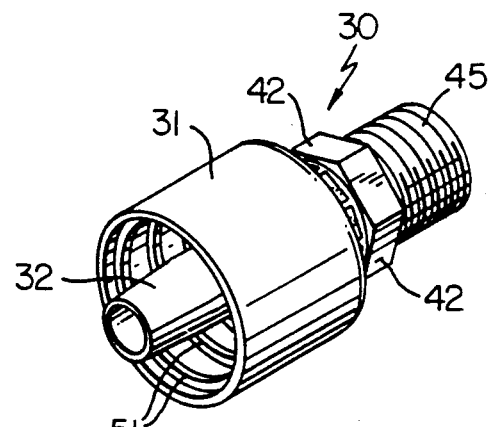
FIG. 2 is a rear perspective view of the hose coupling of FIG. 1.

Referring now to FIGS. 1 and 2, the new hose coupling of this invention is generally indicated by the reference numeral 30 and comprises a ferrule 31 formed of any suitable material, such as metallic material, and an insert 32 interconnected thereto in a manner hereinafter set forth, the insert 32 also being formed of any suitable material, such as metallic material.

Figure 9:
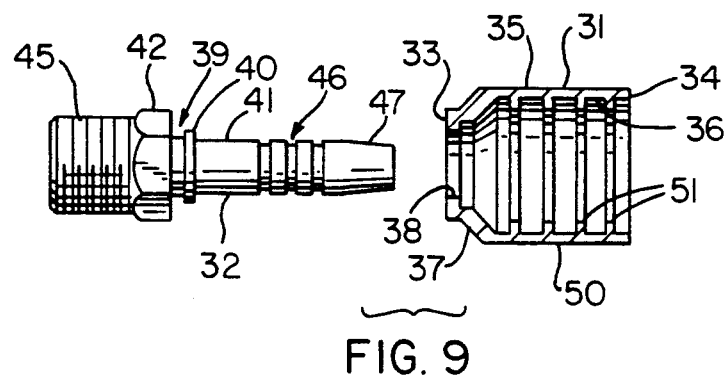
FIG. 9 is an exploded view illustrating the ferrule of FIG. 8 in axial cross-section before the same is assembled to an insert.
Figure 10:
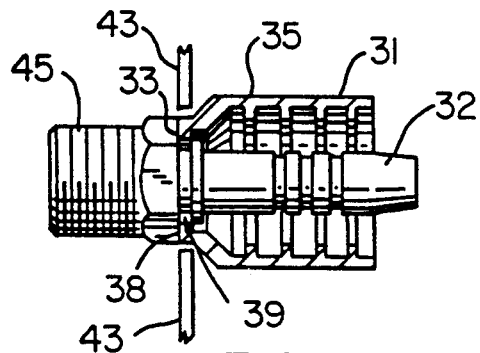
FIG. 10 illustrates the ferrule and insert of FIG. 9 in their assembled condition.
Figure 11:
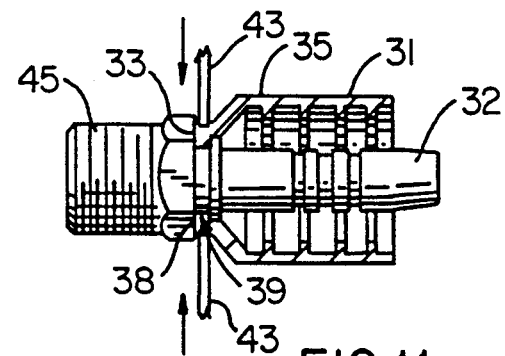
FIG. 11 illustrates how the ferrule of FIG. 10 is subsequently deformed to interconnect with the insert of FIG. 10.
Figure 12:
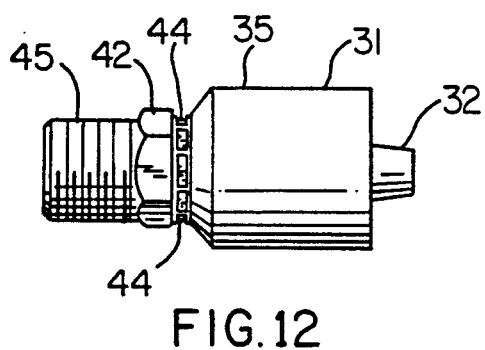
FIG. 12 is a side view in elevation of the completed hose coupling of 11.
Figure 13:
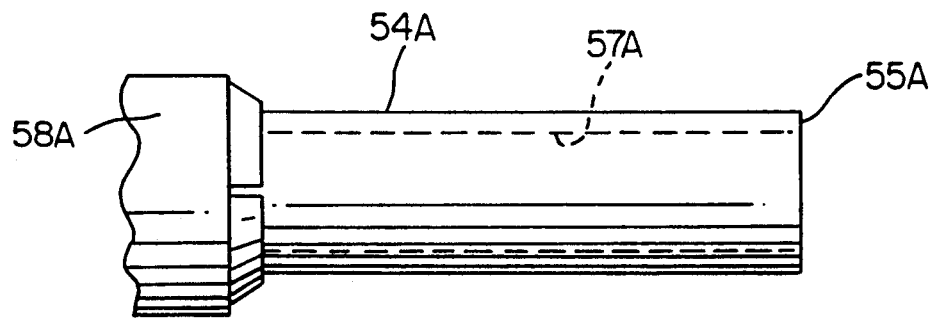
FIG. 13 is a view similar to FIG. 3 and illustrates one step in another new method of this invention.

As illustrated in FIG. 9, the ferrule 31 has opposed ends 33 and 34 as well as an external peripheral surface means 35 and an internal peripheral surface means 36, the end 33 of the ferrule 31 being radially inwardly swedged at 37 and defining a radially inwardly extending annular flange 38 that is subsequently deformed into an annular groove 39 formed in the insert 32 between an annular flange 40 on a spindle 41 thereof and an enlarged hex-shaped nut portion 42. For example, the annular flange 38 can be deformed into the annular groove 39 of the insert 32 in the manner illustrated in FIGS. 10-12 wherein deforming die members 43 are moved against the external peripheral surface 35 of the ferrule 31 at the end 33 thereof to force the annular flange 38 into the annular groove 39 as illustrated in FIG. 11 all in a manner well known in the art whereby the dies form the indentations 44 in the external peripheral surface 35 of the ferrule 31 in the manner illustrated in FIG. 12.

Figure 20:
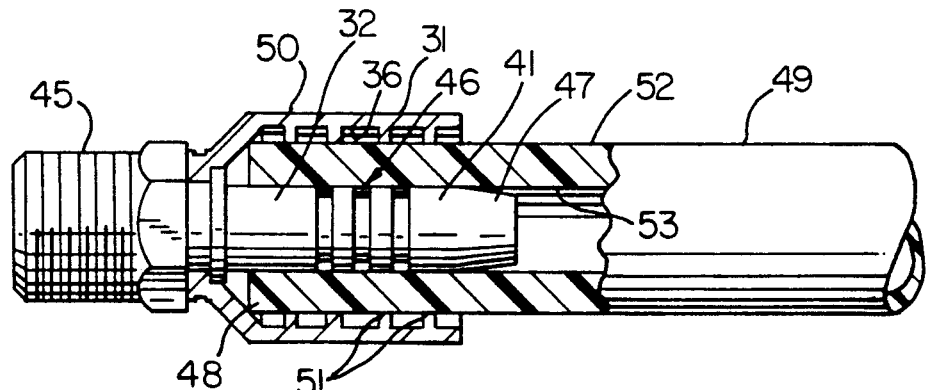
FIG. 20 is a cross-sectional view illustrating how one of the hose coupling of this invention receives an end of a hose therein.
Figure 21:
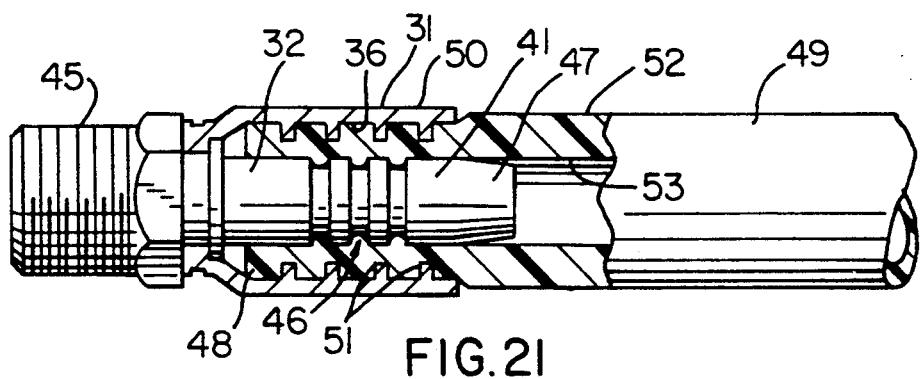
FIG. 21 is a view similar to FIG. 20 and illustrates how the ferrule of the hose coupling of this invention is radially inwardly deformed or crimped to clamp the end of the hose thereto.

The insert 32 has an enlarged externally threaded end 45 for coupling to a coupling nut means (not shown) in a manner well known in the art while the stem 41 of the insert 32 has a plurality of annular grooves 46 formed therein intermediate the flange 40 and a tapering end 47 of the stem 41 that facilitates the insertion of the end 47 of the insert 32 into an end of a flexible hose construction, such as an end 48 of a hose construction 49 of FIGS. 20 and 21 wherein the hose 49 is formed mainly of polymeric material and can have several layers of such polymeric material as well as reinforcement layers as desired whereby the hose 49 is merely schematically illustrated in FIGS. 20 and 21.

The ferrule 31 has a generally cylindrical body portion 50 thereof provided with a plurality of radially inwardly disposed annular projections 51 formed in the internal peripheral surface 36 thereof which will dig into an external peripheral surface 52 of the end 48 of the hose 49 when the ferrule 31 is radially inwardly deformed or crimped toward the insert 32 as illustrated in FIG. 21 by suitable apparatus (not shown) in a manner well known in the art. For example, see the U.S. Pat. No. to Brooks et al, U.S. Pat. No. 4,625,539 whereby this U.S. Pat. No. is being incorporated into this disclosure by this reference thereto.

Such inward collapsing of the ferrule 31 toward the insert 32 causes an internal peripheral surface 53 of the end 48 of the hose 49 to be compressed into the annular grooves 46 of the insert 32 whereby it can be seen that the end 48 of the hose 49 is securely fastened in the hose coupling 30 of this invention in a manner well known in the art with the flow passage in the hose 49 being in fluid communication with the flow passage of the insert that passes completely therethrough in a manner well known in the art. For example, see the aforementioned U.S. Pat. No. to Brooks et al, U.S. Pat. No. 4,625,539.

While the general structure and operation of the hose coupling 30 of this invention is well known in the art, the method of making the hose coupling 30 of this invention is unique and will now be described.

Figure 3:
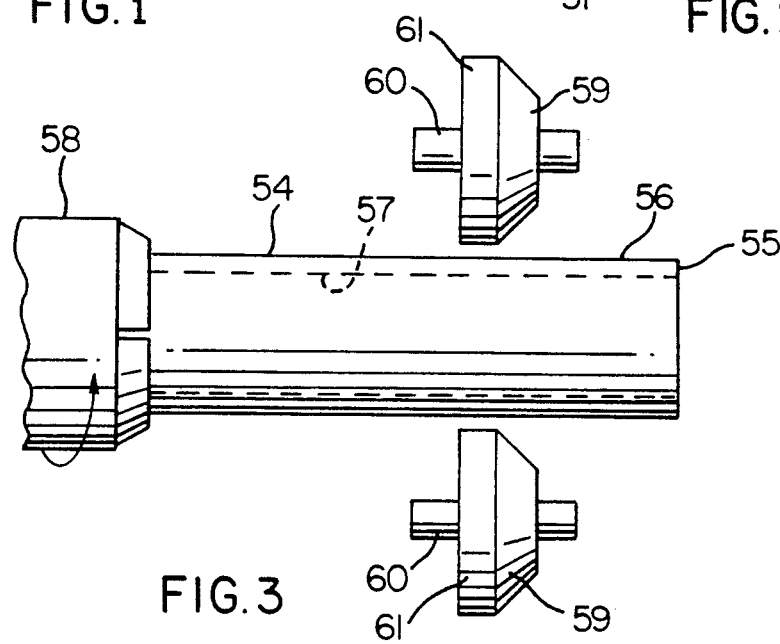
FIG. 3 is a schematic view illustrating one of the steps of the method of this invention of making the hose coupling of FIG. 1.
Figure 4:
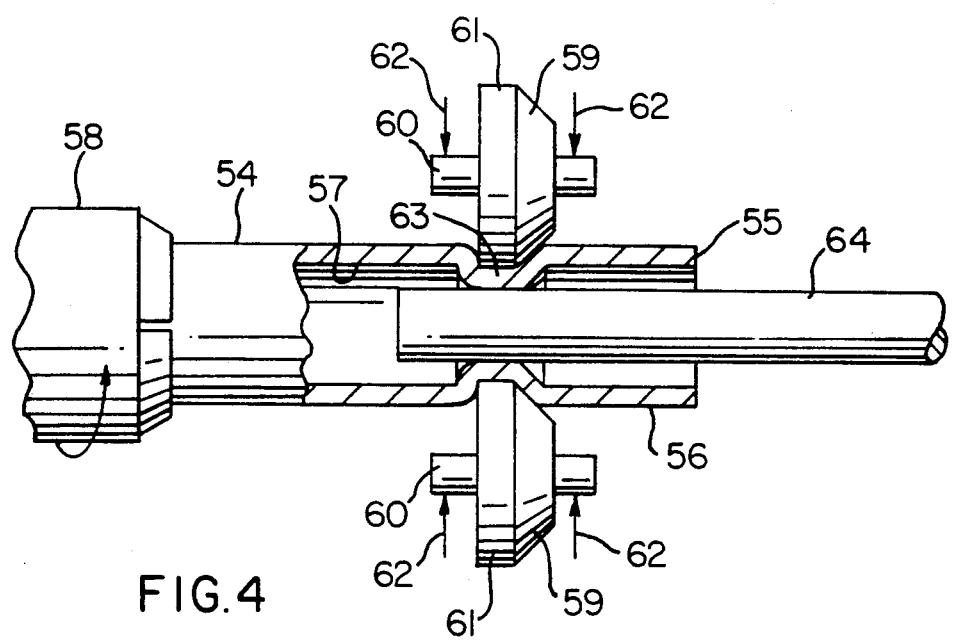
FIG. 4 is a view similar to FIG. 3 and illustrates another step in the method of this invention wherein rotating tubular stock is inwardly swedged.
Figure 5:
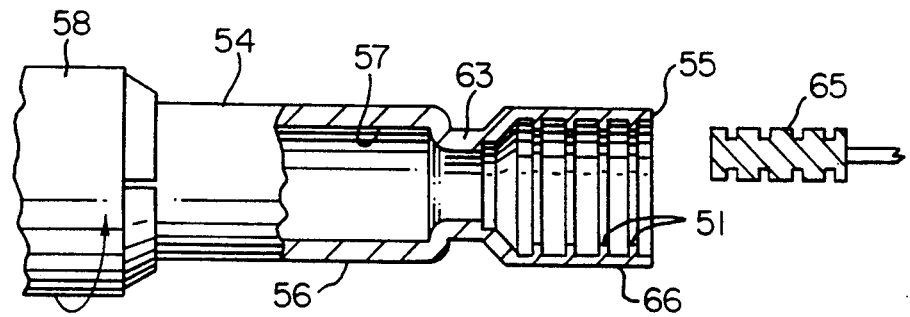
FIG. 5 is a view similar to FIG. 4 and illustrates how the swedged stock of FIG. 4 is internally cut.

The ferrule 31 of this invention is made from a length of tubular metallic stock 54 that has opposed ends, only the end 55 being illustrated in FIG. 3 and having a substantially smooth outer peripheral surface 56 and a substantially smooth internal peripheral surface 57, the stock 54 being adapted to have the non-shown end thereof fixed in a rotatable chuck 58 that is adapted to be rotated to rotate the stock 54 about the longitudinal axis thereof at any suitable speed. Two or more swedging rollers 59 that are respectively mounted on rotatable shafts 60 have forming peripheral surfaces 61 that are adapted to be urged toward the rotating stock 54 as indicated by the arrows 62 in FIG. 4 to inwardly shape a section 63 of the stock 54 intermediate the opposed ends thereof at a predetermined location relative to the end 55 thereof as illustrated in FIG. 4, cylindrical metallic mandrel 64 having been first initially inserted in the end 55 of the stock 54 so as to cooperate with the rollers 59 to define the now deformed section 63 which is in the final shape 37 for the resulting ferrule 31 as will be apparent hereinafter.

After the rollers 59 have been retracted from the stock 54 and the mandrel 64 has been removed out of the end 55 of the stock 54, a suitable rotatable cutting means 65 is inserted in the end 55 of the stock 54 and the stock can also be rotated by the chuck 58 or the chuck 58 can be stationary and only the cutting means 65 needs to be rotating.

In any event, the cutting means 65 forms or cuts the internal peripheral surface 57 of the portion 66 of the stock 54 that is located between the end 55 and the deformed section 63 thereof to form the plurality of inwardly directed projections 51 for the resulting ferrule 31 in the configurations previously described.

Figure 6:
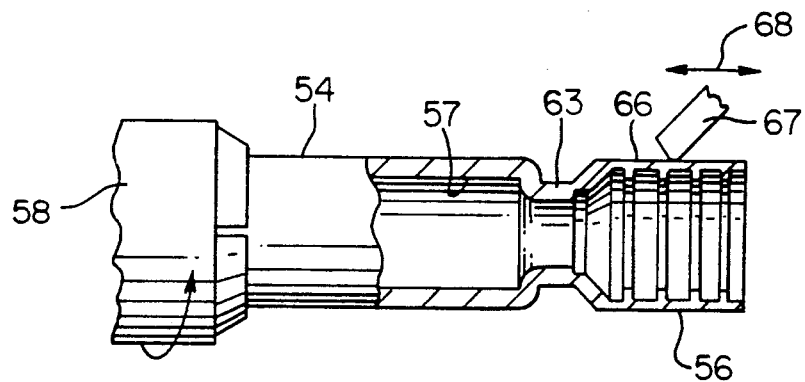
FIG. 6 is a view similar to FIG. 5 and illustrates another step of the method of this invention for finishing the outer peripheral surface of a portion of the swedged tubular stock.

Thereafter the cutting means 65 is removed from the stock 54 and a suitable shaping tool 67 can be utilized to shape or finish the external peripheral surface 56 of the portion 66 by moving the same back and forth in the directions of the arrows 68 in FIG. 6 while the chuck 58 is rotating the stock 54 so as to provide a smooth external peripheral surface 35 for the resulting ferrule 31.

Figure 7:
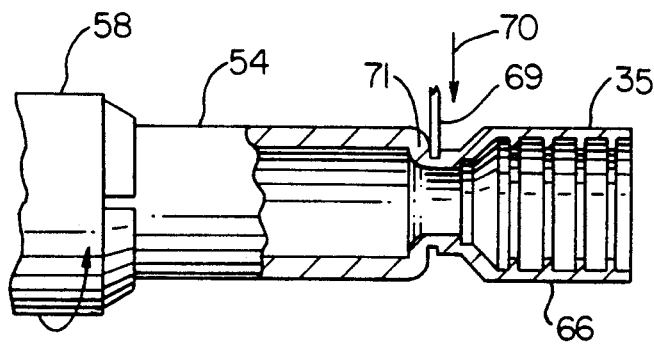
FIG. 7 is a view similar to FIG. 6 and illustrates how a portion of the swedged tubular stock is cut from the remainder of the stock.
Figure 8:
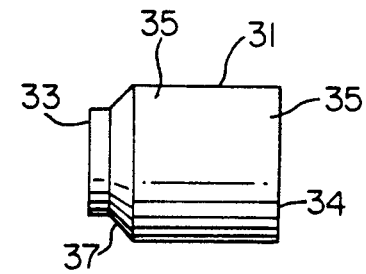
FIG. 8 is a side view of the ferrule cut from the stock of FIG. 7.

As illustrated in FIG. 7 after the forming tool 67 has been utilized, a suitable cutter 69 is moved in the direction of the arrow 70 while the chuck 58 is rotating the stock 54 so as to cut the resulting portion 66 from the stock 54 to define the ferrule 31 as illustrated in FIG. 8 which can then be joined with the insert 32 in the manner illustrated in FIGS. 9-12 and previously described.

The cutter 69 can also be utilized to thereafter cut the stock 54 to remove the remaining part 71 of the stock 54 to produce a new end 55 therefor so as to permit another ferrule 31 to be formed from the remaining stock 54 in the manner previously described.

Instead of utilizing the mandrel 64 to cooperate with the rollers 59 in forming the portion 63 of the stock 54 as previously described, the insert 32 itself can be utilized as the mandrel in a unique manner.

For example, another hose coupling of this invention is generally indicated by the reference numeral 30A and parts thereof similar to the parts of the hose construction 30 previously described are indicated by like reference numerals followed by the reference letter "A".

Figure 19:
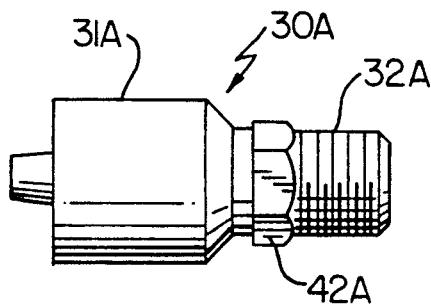
FIG. 19 is a side view of the completed hose coupling that has been cut from the tubular stock of FIG. 18.

As illustrated in FIG. 19, the hose coupling 30A comprises the ferrule 31A and the insert 32A.

The ferrule 31A for the hose coupling 30A is formed from the tubular stock 54A that has the non-illustrated end thereof inserted in the rotatable chuck 58A so that the end 55A is remote from the chuck 58A.

Figure 14:
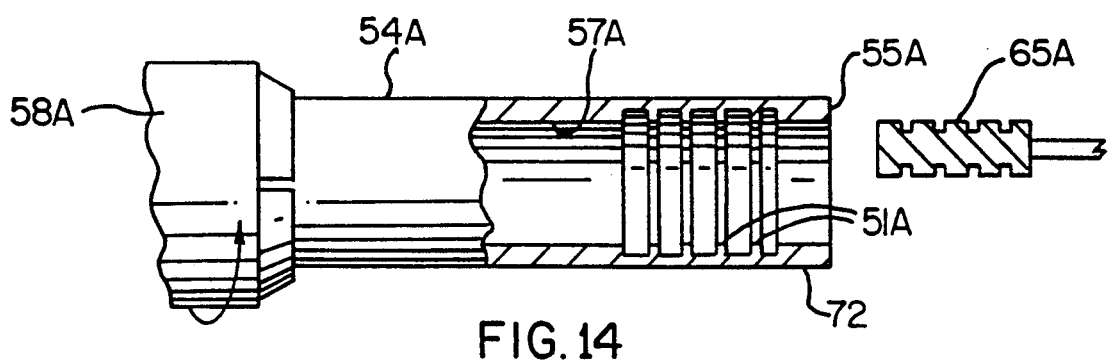
FIG. 14 is a view similar to FIG. 13 and illustrates how a portion of the rotating tubular stock has the internal peripheral surface thereof cut into according to another step of the method of this invention.

A portion 66A of the stock 54A is initially cut into by the cutting tool 65A that has been inserted in the end 55A of the stock 54A by having the tool 65A itself rotating or just the chuck 58 rotating or a combination of the stock 54A and the tool 65A both rotating. In any event, the internal peripheral surface means 57A is formed by the cutting tool 65A to provide the inwardly directed projections 51A, as well as the flange 38A if desired, in a manner previously described with the projections 51A being disposed inwardly from the end 55A a distance represented by the reference numeral 72 in FIG. 14.

Figure 15:
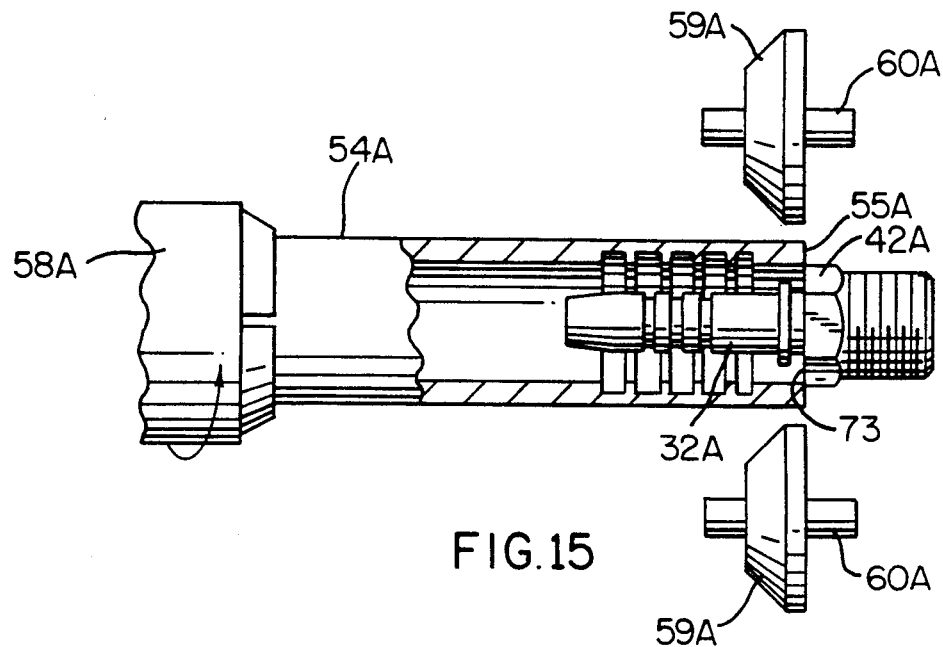
FIG. 15 is a view similar to FIG. 14 and illustrates how an insert of a hose coupling is disposed in the stock of FIG. 14 before the same is radially inwardly swedged.
Figure 16:
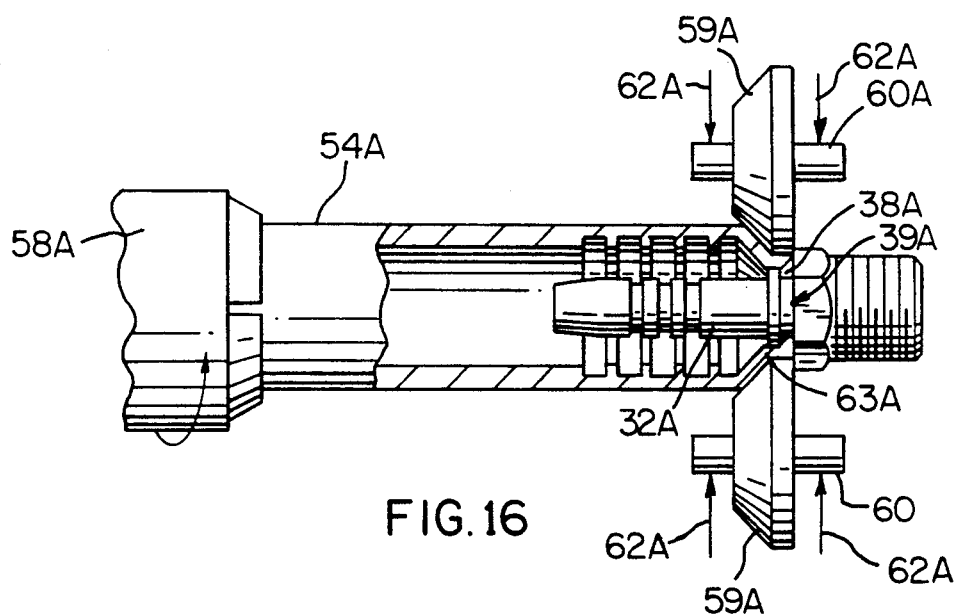
FIG. 16 is a view similar to FIG. 15 and illustrates how the rotating stock of FIG. 15 is radially inwardly swedged to not only form a swedged portion of the tubular stock but also to interconnect the swedged portion of the ferrule to the insert that has been inserted therein.

Thereafter, an insert 32A is inserted in the end 55A of the stock 54A in the manner illustrated in FIG. 15 so that the surface 73 of the nut portion 42A of the insert 32A is adjacent the end 55A of the stock 54A. Thereafter, the shaping rollers 59A on their shafts 60A, but having been turned in the opposite direction from the rollers 59 of FIGS. 3 and 4, are moved radially inwardly while the stock 54A is being rotated by the rotating chuck 58A in the manner illustrated in FIGS. 15 and 16 to deform the stock 54A into the portion 63A thereof that forms the part 37A of the ferrule 31. In addition, the rollers 59A are moved radially inwardly in the direction of the arrows 62A a distance sufficient to cause the part 63A to form the flange 38A into the annular groove 39A of the insert 32A as illustrated in FIG. 16 so as to interconnect the section 63A of the stock 54A directly to the insert 32A as illustrated.

Figure 17:
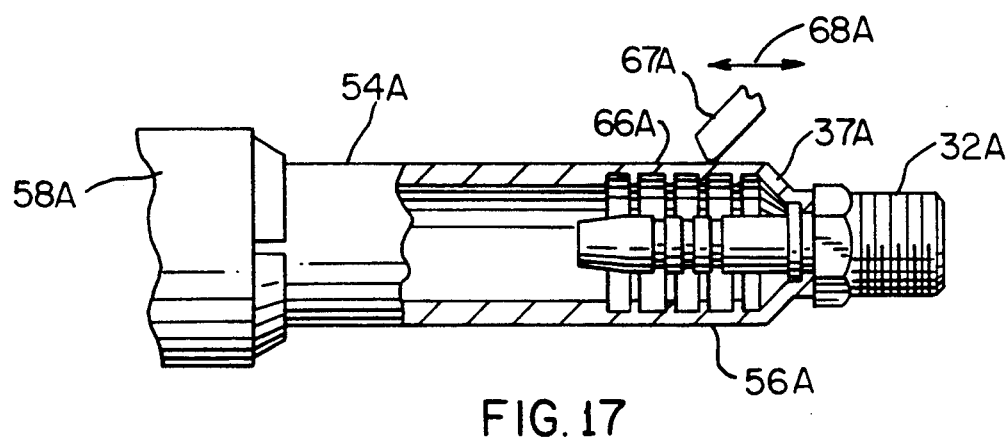
FIG. 17 is a view similar to FIG. 16 and illustrates how the outer peripheral surface of a portion of the tubular stock is shaped.

Thereafter, as illustrated in FIG. 17, the shaping tool 67A can be utilized to shape the external peripheral surface 56A of the stock 54A, such as by moving the tool 67A back and forth as represented by the arrows 68A.

Figure 18:
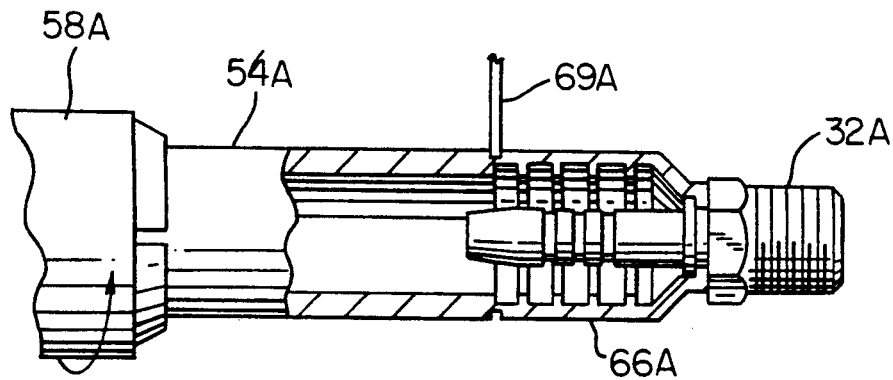
FIG. 18 is a view similar to FIG. 17 and illustrates how the formed of the tubular stock is cut therefrom.

The stock 54A is then cut off by the cutting tool 69A at the proper location to form the completed ferrule 31A as well as the completed hose coupling 30A as illustrated in FIG. 18.

Therefore, it can be seen that the method of this invention illustrated in FIGS. 13-18 produces the hose coupling 30A without requiring the stock 54A to utilize a separate mandrel 64 therewith when utilizing the rollers 59A so that the method of FIGS. 13-18 forms the hose coupling 30A when the portion 66A of the stock 54A is cut therefrom by the cutting tool 69A as previously described, the cutting tool 69A thereby forming a new end 55A on the stock 54A so as to permit another hose coupling 30A to be formed from the stock 54A in the manner previously set forth.

While the ferrule 31 or 31A and the insert 32 or 32A therefor can have any suitable dimensions and be formed of any suitable material, the following dimensions are given for one working embodiment of the hose coupling 30 or 30A of this invention with the understanding that the same is not to be a limitation on this invention.

In particular, one working embodiment of this invention has the ferrule 31 or 31A formed of aluminum 6061 T6 wherein the inside diameter thereof is approximately 0.810 to 0.820 of an inch, the outer diameter thereof is approximately 1.048 to 1.058 inches and the length between the ends 33 or 33A and 34 or 34A thereof is approximately 1.195 to 1.205 inches. The insert 32 or 32A is formed of brass and is approximately 2.337 inches long with the annular groove 39 or 39A being defined by a diameter of approximately 0.491 to 0.501 of an inch while the diameter of the flange 40 or 40A is approximately 0.589 to 0.599 of an inch.

Therefore, it can be seen that this invention not only provides a new method of making a ferrule for a hose coupling and a new method of making a hose coupling utilizing such ferrule, but also this invention provides a new ferrule for a hose coupling and a new hose coupling respectively made by the methods of this invention.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a hose coupling that comprises a ferrule having opposed ends and an insert interconnected to one of said ends of said ferrule so that an end of a hose can be inserted into the other of said ends of said ferrule and over said insert to be subsequently clamped between said ferrule and said insert, the improvement comprising the steps of forming said ferrule from a length of tubular stock that has opposed ends by rotating said stock, inserting part of said insert into one of said opposed ends of tubular stock, inwardly swedging said stock at said one of said opposed ends thereof to define said one end of said ferrule while said stock is rotating and to interconnect said one end of said ferrule to said part of said insert, and then cutting off a portion of said stock at a desired location thereon that is spaced inwardly from said one end of said stock to form said other end of said ferrule and to complete said coupling while said desired location on said stock becomes a new one end thereof for forming another coupling in the above manner.

2. A method as set forth in claim 1 and comprising the step of forming the internal peripheral surface of said ferrule to have a plurality of radially inwardly directed annular projections.

3. A method as set forth in claim 2 wherein the step of forming said internal peripheral surface comprises the step of cutting into said internal peripheral surface.

4. A method as set forth in claim 2 wherein the step of forming said internal peripheral surface takes place while said stock is rotating and before the step of inserting said part of said insert into said one of said opposed ends of said stock.

5. A method as set forth in claim 1 wherein the step of swedging said stock comprises the step of urging swedging roller means radially inwardly against said rotating stock to swedge said stock against said part of said insert.

* * * * *